United States Patent [19]

Adams et al.

[11] 4,271,333

[45] Jun. 2, 1981

[54] PUSHBUTTON DIAL ASSEMBLY

[75] Inventors: William J. Adams, Franklin; William F. Wernet, Nashville, both of Tenn.

[73] Assignee: Northern Telecom, Inc., Ottawa, Canada

[21] Appl. No.: 78,692

[22] Filed: Sep. 25, 1979

[51] Int. Cl.³ .............................................. H01H 3/12
[52] U.S. Cl. ............................. 179/90 K; 340/365 A; 200/5 A
[58] Field of Search ................. 179/90 K; 340/365 S, 340/365 A; 200/5 A, 5 R, 46, 159 R, 159 B; 361/2

[56] References Cited

U.S. PATENT DOCUMENTS

| | | | |
|---|---|---|---|
| 3,591,749 | 7/1971 | Comstock | 340/365 A |
| 3,617,660 | 11/1971 | Krakinowski | 340/365 A |
| 3,627,930 | 12/1971 | Tolman | 179/103 |
| 3,707,609 | 12/1972 | Dapot et al. | 340/365 A |
| 3,725,907 | 4/1973 | Boulanger | 179/90 K |
| 4,033,030 | 7/1977 | Robinson et al. | 179/90 K |
| 4,040,120 | 8/1977 | Geadan et al. | 361/220 |
| 4,124,785 | 11/1978 | Seretny et al. | 179/103 |
| 4,128,744 | 12/1978 | Seeger | 200/5 A |

OTHER PUBLICATIONS

"Force Concentrator for Touch Sensitive Panel Using Snap-Action Switches" IBM Technical Disclosure Bulletn, vol. 19, #1, p. 238 Jun. 1976.

*Primary Examiner*—Gerald L. Brigance
*Attorney, Agent, or Firm*—Schwartz, Jeffery, Schwaab, Mack, Blumenthal & Koch

[57] ABSTRACT

A pushbutton dial assembly, particularly for a telephone handset, is in the form of a sandwich structure comprising a pushbutton member having a plurality of push buttons; a flexible transfer member having a plurality of actuating members, one for each push button, each actuating member having a domed portion extending away from the push button; a flexible contact member having a plurality of domed areas or bubbles, the domed areas extending towards the actuating members and in contact with the domed portions, the concave surface of each domed area having a conducting surface; a flexible insulating spacer member with apertures aligned with the domed areas; and a circuit member having a plurality of contact areas, a contact area aligned with each domed area, and a circuit pattern interconnecting the contact areas. Pressure on a pushbutton causes a domed portion to depress the related domed area which snaps through to make contact with the related contact area. The circuit member can be part of a flexible circuit member carrying electronic components. Grounding means are provided for by-passing static charges occurring on actuation of push button by a user.

15 Claims, 9 Drawing Figures

PUSHBUTTON DIAL ASSEMBLY

This invention relates to a pushbutton dial assembly, and to a handset incorporating such an assembly, particularly for an electronic telephone handset.

There is described in U.S. Pat. No. 4,029,916, in the name of the present assignee, a pushbutton dial in which contact occurs by deformation of a spring contact member which has a snap action. The spring contact members of the dial assembly are actuated by pushbuttons which are moulded integrally as parts of a pushbutton member. The pushbuttons are cantilevered, being detached on three sides and connected to the member by a thin hinge portion. The spring contact member is of metal with a plurality of switch positions defined in the member, each switch position having a spring contact formed by a domed portion with radially extending contacts. This form of dial is less expensive than previous forms of pushbutton switches in which actuation of a pushbutton moved members which in turn actuated contacts.

The present invention provides a further simplification of a pushbutton dial assembly, which is less costly than the dial described in the above-mentioned patent. In its broadest aspect, the present invention provides a push button dial assembly comprising in sequence, a pushbutton member having a plurality of pushbuttons, conveniently molded integrally therewith and cantilevered therefrom; a transfer member in contact with the back surface of the pushbutton member and having a plurality of cantilevered actuating members, one for each pushbutton; a plastic material contact member having a plurality of domed or bubble portions, one for each actuating member; an electrically insulating spacer member having apertures aligned with the domed portions; and a circuit member having a plurality of contact areas, one for each domed portion, the domed portions having electrically conducting surfaces for contact with the contact areas of the circuit member.

The dial assembly is particularly suitable for use in an electronic telephone handset in which the electronic and electrical components are, for at least the major part, mounted in the handset. Conveniently the electronic components, and at least some of the electrical components, can be mounted on a flexible circuit member, the flexible circuit member also including the circuit member having the contact areas.

The invention will be readily understood by the following description of certain embodiments, by way of example, in conjunction with the accompanying drawings, in which.

Figure 1:
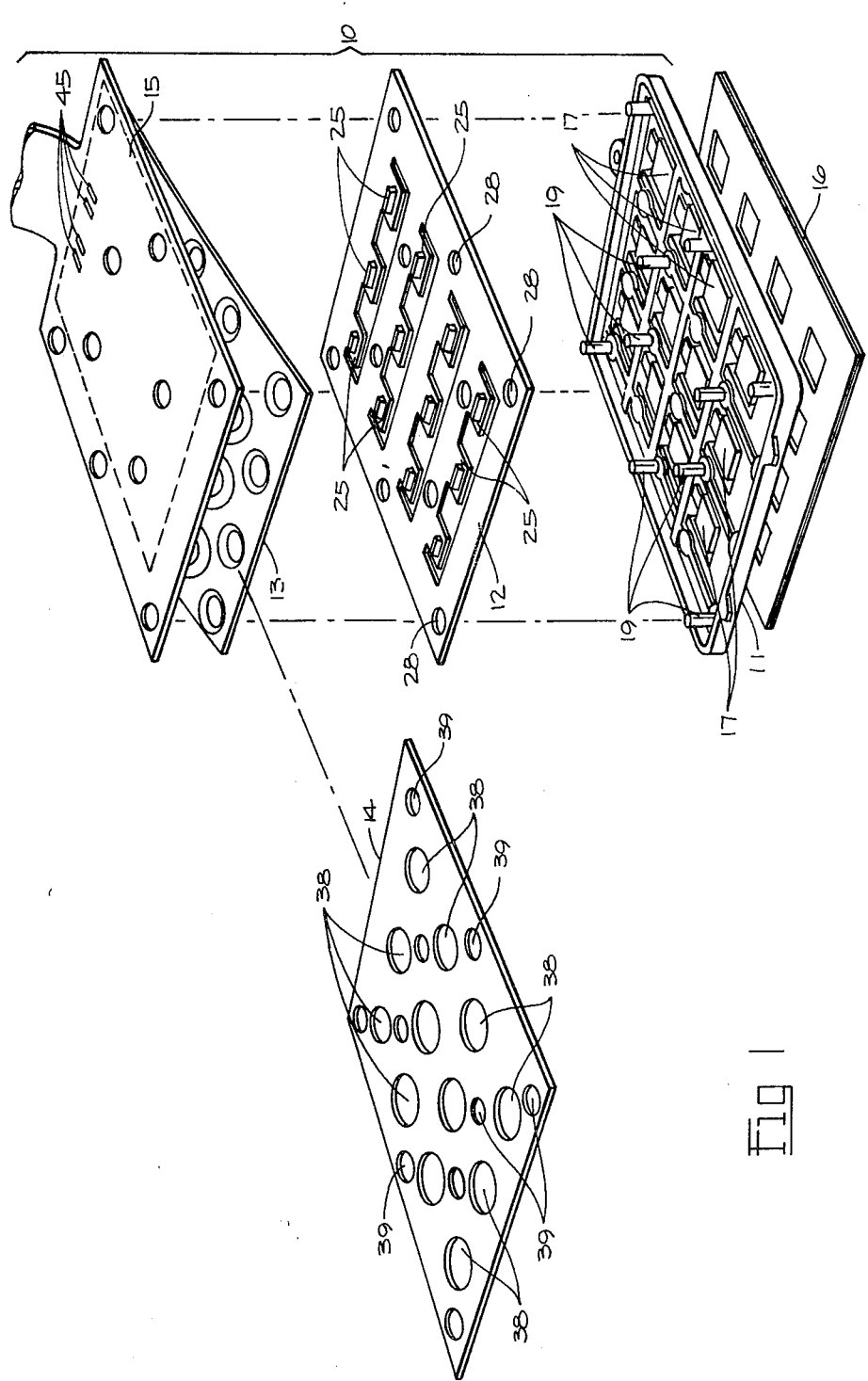
FIG. 1 is an exploded perspective view of a pushbutton dial assembly.
Figure 7:
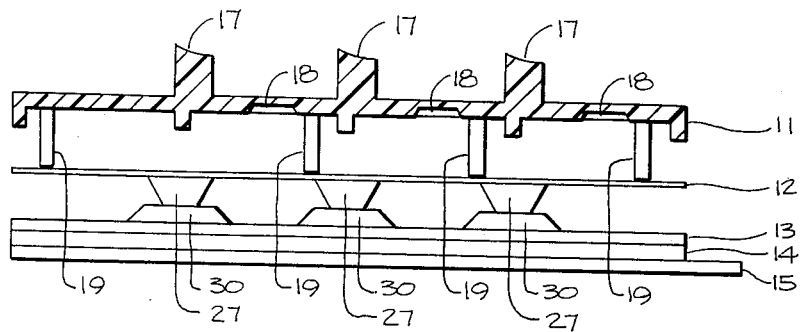
FIG. 7 is a cross-section through a push-button dial, with the various members in juxtaposition.

As illustrated in FIGS. 1 and 7, the pushbutton dial assembly 10 comprises a sandwich structure, including a molded push button member 11, a plastic material transfer member 12, a plastic material contact member 13, an electrically insulating member 14 and a circuit member 15. As a separate item there is a face plate 16.

The pushbutton member 11 has a plurality of cantilevered push buttons 17 arranged in columns and rows, the buttons extending from the front side of member 11. The buttons 17 are molded integrally as parts of the member 11 but are separated on three sides and connected by a thin portion 18 which acts as a hinge. A series of pins 19 extending from the back of member 11 provide alignment means for aligning the various members.

Figure 5:
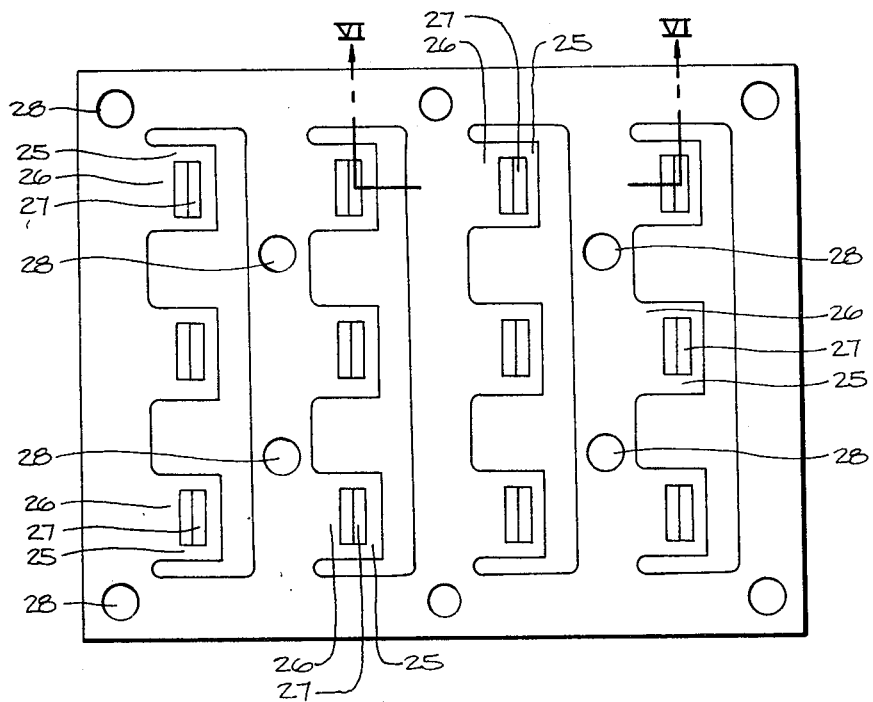
FIG. 5 is a plan view of a transfer member.
Figure 6:
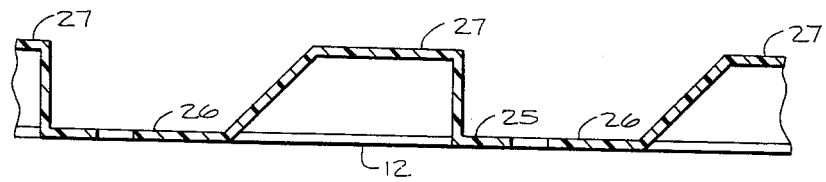
FIG. 6 is a cross-section on the line VI—VI of FIG. 5.

The transfer member 12, illustrated also in FIGS. 5, 6 and 7, is comprised of a thin sheet of flexible insulating material, for example mylar and has a plurality of cantilevered actuating members 25 integral therewith. The actuating members are in columns and rows, an actuating member aligned with each push button 17 and is separated on three sides from the main sheet of material, the fourth side acting as a hinge, at 26. Each actuating member has a domed portion 27, as seen in cross-section in FIG. 6. The portions 27 extend from the back surface of the transfer member 12. Perforations 28 in the member 12 locate on the pins 19.

Figure 3:
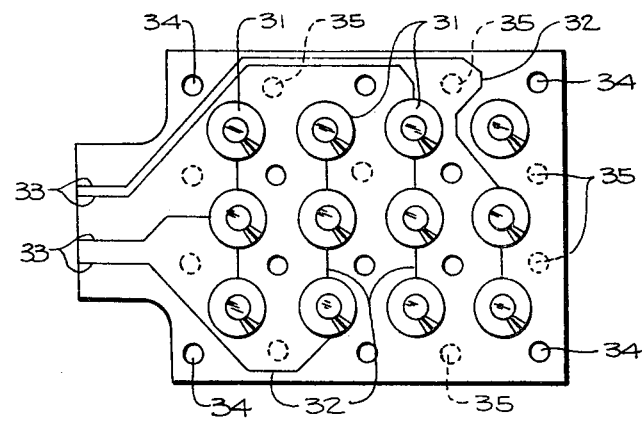
FIG. 3 is a plan view of a contact member.

The contact member 13 is formed from a thin sheet of electrically insulating material for example, mylar. A plurality of domed areas 30 are formed in the member 13, extending from the front surface. The areas 30 are aligned with the portions 27 of the transfer member 12. The form of the domed areas 30 is seen in FIG. 7, which FIG. 3 is a plan view on the back surface. Each domed area 30 is metallized on the back surface, that is on the concave side or surface, at 31 in FIG. 3. The metallized surface forms a contact surface and these surfaces are interconnected by conductors 32 on the back surface of the member 13. The conductors 32 extend to an edge of the member 13, at 33, for connection to the circuit member 15. Perforations 34 locate on the pins 19 and small domed portions 35 maintain a slight clearance between the contact member 13 and the transfer member 12.

Figure 4:
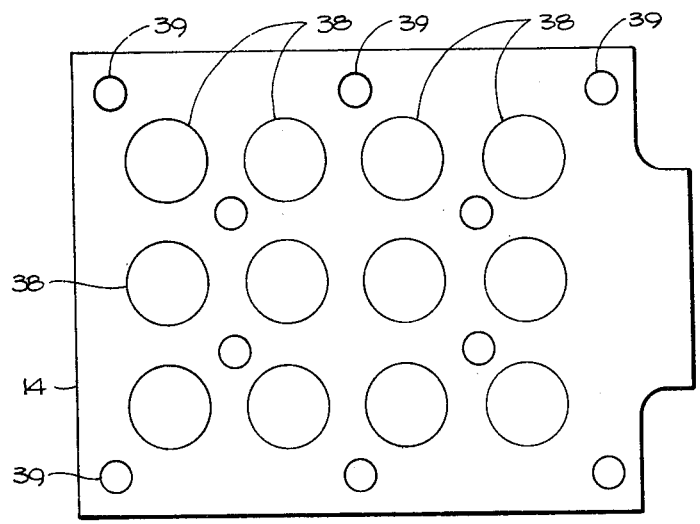
FIG. 4 is a plan view of a spacer member.

The insulating member 14, illustrated in FIG. 4, is a thin sheet of plastic material having a plurality of large apertures 38, an aperture aligned with each domed area 30 on the contact member. Small perforations 39 locate on the pins 19.

Figure 2:
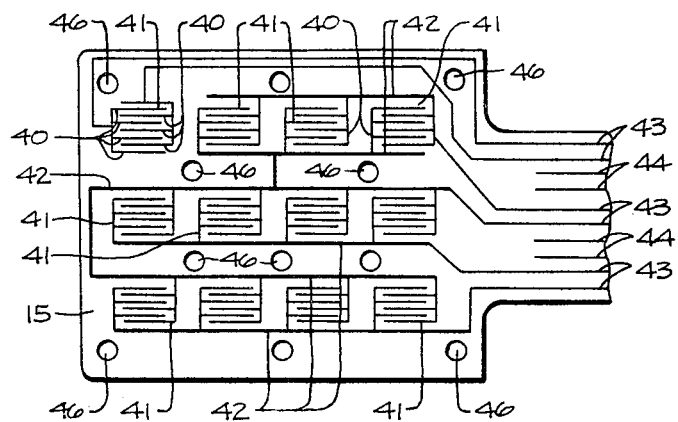
FIG. 2 is a plan view of a circuit member.

The circuit member 15 carries on its front surface a conductor pattern, as illustrated at 40 in FIG. 2. The conductor pattern defines a plurality of contact areas, indicated at 41, an area aligned with each domed area 30. The contact areas are interconnected by conductors 42 which extend to an edge of the circuit member, at 43. The conductors at 43 are connected to the electrical and/or electronic components of the telephone set. Also provided are conductors 44 which also connect to the other components of the telephone set and which are connected also to the conductors at 33, FIG. 1 for the contact member 13. Conductors 44 and 33 are interconnected, in the present example, by metal staples indicated at 45 in FIG. 1. The staples pass through both sets of conductors 44 and 33 and interconnect them. Perforations 46 locate on the pins 19.

When the various members 11, 12, 13, 14 and 15 have been assembled, the pins 19 can be deformed at their ends to enlarge and retain the members in an assembled condition. The assembly as such can be used in any suitable position in a telephone set or other form of telecommunication apparatus. Although described and illustrated in the particular form for a telephone dial, the form can vary, such as to disposition and number of the pushbuttons. Pressure on a pushbutton 17 acts on an actuating member and the domed portion of the actuating member presses on the related domed area or bubble, causing it to snap down into contact with the related contact area on the circuit member.

Figure 8:
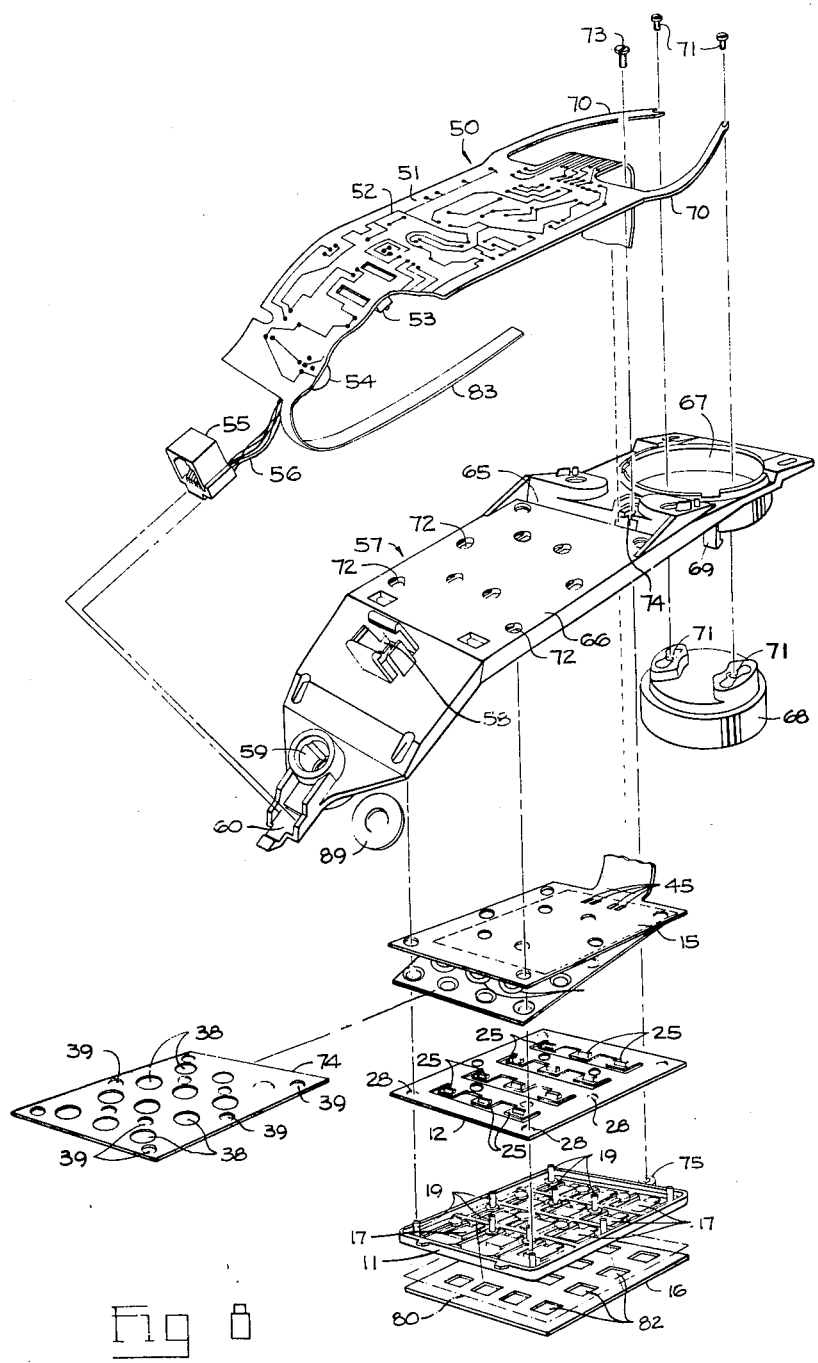
FIG. 8 is an exploded perspective view of the pushbutton dial assembly of FIG. 1 in association with a support chassis and flexible printed circuit for a handset.
Figure 9:
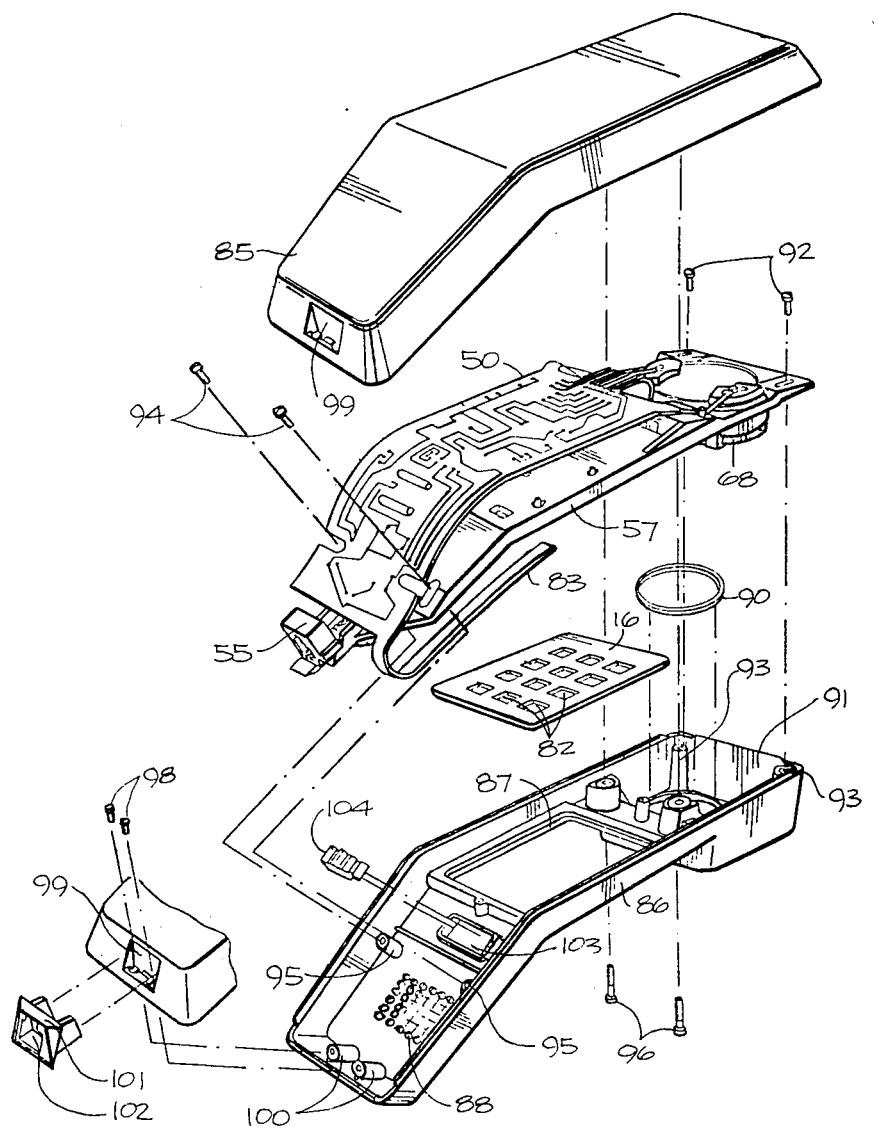
FIG. 9 is an exploded perspective view of a telephone handset incorporating the sub-assembly as illustrated in FIG. 7.

The assembly as so far described is convenient for use in the handset of a telephone set, and in particular for a handset of an electronic telephone with the components in the handset. FIGS. 8 and 9 illustrate a handset arrangement for an electronic telephone. The circuit member 15 is one end of an elongate flexible circuit member 50. The other end 51 of the flexible circuit member 50 has on its back surface a conductor pattern 52, which electrical and electronic components are mounted on the front surface, contact pins on the components passing through the flexible circuit member 50 and being connected, as by wave soldering, to the conductor pattern 52. A small switch is seen at 53 and an electret microphone at 54. A modular jack is seen at 59, connected by conductor leads 56 to the flexible circuit member.

The flexible circuit member 50 in the example illustrated, is mounted on a rigid chassis member 57. The small switch snaps into a snap-in position 58, and the microphone 59 pushes into a hollow boss 59. The jack 55 is mounted at position 60. The flexible circuit member passes down through a slot 65 in the chassis member, and folds back against the center section 66. This is the part forming the circuit member 15. At the end of the chassis remote from the microphone 54 is a hollow boss 67 which forms a snap-in position for a transmitter 68. The transmitter is held in by resilient members 69. Two extensions 70 of the flexible circuit member 50, having electrically conductive layers thereon, connect to terminals 71 on the transmitter. In this arrangement, the pins 19 on the pushbutton member pass up through holes 72 in the center section 66 of the chassis member 57. The pins can be a force fit in the holes, or can be rivetted or formed over. A screw 73 can also be used, through a hole 74 in the chassis member and screwing into a boss 75 on the pushbutton member.

A problem which can arise with electronic telephones is the occurrence of static electrical charges being discharged through the telephone circuit, damaging components. Such static charges build up on a user, walking over a synthetic material carpet, or if the atmosphere is very dry, and other ways. When the user touches a pushbutton 17, this static charge is discharged into the circuit. To avoid this a ground plane is provided between the face plate 16 and the pushbutton member 11. This can be a sheet of, for example, aluminum foil, indicated in chain dotted outline at 80 in FIG. 8. Holes in the foil align with holes 82 is the face plate 16, through which the pushbuttons 17 project. Alternatively, the rear surface of the face plate 16 can be metallized. The front surface of the pushbutton member could be metallized but this could be more difficult and interfere with the aesthetic appearance. A ground plane is also provided on either the front or back surface of the flexible circuit member 51 and a flexible tongue 83 is stapled to the flexible circuit member, the tongue having a conductive layer on one surface. After assembly of the push button dial to the chassis member, the tongue is brought down and over the pushbutton member, over the foil 80 if provided, and then the face plate positioned on the assembly. The conductive layer on the tongue either makes contact with the foil, if provided, or with the metallized surface on the faceplate. The ground plane on the flexible circuit member 50 is connected to a ground connection.

FIG. 9 illustrates a complete handset embodying the assembly illustrated in FIG. 8. The handset has back and front housings 85 and 86, and the assembled chassis member 57 and flexible circuit member 50. A pushbutton dial assembly is attached to the front face of the chassis member. The transmitter 68 is also in position. The face plate 16 is shown in position to fit in an opening 87 in the front housing, and the tongue 83 is seen bent down and round under the chassis member to be between the pushbutton assembly and the face plate. A perforated area 88 is provided at the receiver position and a sealing washer 89 (FIG. 8) is provided between chassis member and front housing. A sealing ring 90 is also provided between the transmitter 68 and the front housing 86. The transmitter sits in a cup-shaped portion 91 of the front housing and the cup-shaped portion has a perforated base, not seen.

The chassis member 57 is held in the front housing by screws 92 screwing into bosses 93 at the transmitter end and by two further screws 94 screwing into bosses 95 adjacent to the receiver position. The back housing attaches to the front housing by screws 96 passing through bosses 97 in the front housing and screwing into bosses (not seen) in the back housing. Two further screws 98 pass through holes in a cress 99 at the receiver end and screw into bosses 100 in the front housing. After insertion of the screws 98 an insert 101 is pushed into the recess 99 and snaps into position. The insert 101 has an aperture 102 aligned with the jack 55. An opening 103 in the front housing has a push-member 104 positioned therein, the push-member 104 in contact with the small switch 53.

What is claimed is:

1. A pushbutton dial assembly, comprising, in sequence and in a sandwich formation; a pushbutton member having a plurality of pushbuttons; a flexible transfer member in contact with a back surface of the pushbutton member, the transfer member having a plurality of cantilevered actuating members, one for each pushbutton, each actuating member having a domed portion extending from a back surface of the transfer member; a flexible contact member having a plurality of domed areas comprised of a plastic material extending from a front surface, each domed area of the contact member aligned with a domed portion of an actuating member and in contact therewith, each domed area having an electrically conductive surface on a back, concave surface, and electrical conductors on a back surface of the contact member connecting to said electrically conductive surfaces; a flexible electrically insulating spacer member having apertures aligned with the domed areas; and a circuit member having a plurality of contact areas, a contact area aligned with each domed area, and an electrical circuit pattern connected to said contact areas; the arrangement being such that pressure on a pushbutton depresses an actuating member, the domed portion on the actuating member pressing on and deforming the related domed area, the domed area snapping down to contact the related contact area on the circuit member.

2. A dial assembly as claimed in claim 1, said pushbutton molded integrally with said pushbutton member, each said pushbutton separated from the pushbutton member on three sides and cantilevered at a fourth side.

3. A dial assembly as claimed in claim 1, said pushbuttons arranged in columns and rows.

4. A dial assembly as claimed in claim 1, further including a face plate positioned on a front face of the push button member, the face plate includng a plurality of apertures, an aperture for each pushbutton, a pushbutton extending through each aperture.

5. A dial assembly as claimed in claim 4, said circuit member being part of a flexible circuit member and electronic components mounted on a further part of the flexible circuit member, a ground plane on said further part, a flexible electrically conductive member connected at one end to said ground plane, said flexible electrically conductive member extending at its other end between said pushbutton member and said face plate, and electrical grounding means at an interface between said pushbutton member and said face plate in contact with said flexible electrically conductive member, whereby on connection of said ground plane to an electrical ground, static charges discharging at said pushbuttons by-pass said electronic components.

6. A pushbutton dial assembly for a telephone handset, comprising:

an elongate rigid chassis member;

an elongate flexible circuit member having a main portion positioned along a back surface of the chassis member, and an end portion extending down through a slot in said chassis member, the chassis member including a center section, said end portion extending back over a front surface of said center section of the chassis member, and a pushbutton dial comprising in sequence and in a sandwich formation; a pushbutton member having a plurality of pushbuttons; a flexible transfer member in contact with a back surface of the pushbutton member, the transfer member having a plurality of cantilevered actuating members, one for each pushbutton, each actuating member having a domed portion extending from a back surface of the transfer member; a flexible contact member having a plurality of domed areas comprised of a plastic material extending from a front surface, each domed area of the contact member aligned with a domed portion of an actuating member and in contact therewith, each domed area having an electrically conductive surface on a back, concave surface, and electrical conductors on a back surface of the contact member connecting to said electrically conductive surfaces; a flexible electrically insulating spacer member having apertures aligned with the domed areas; and a circuit member having a plurality of contact areas, a contact area aligned with each domed area, and an electrical circuit pattern connected to said contact areas, the contact member formed by said end portion of said flexible circuit member; the arrangement being such that pressure on a pushbutton depresses an actuating member, the domed portion on the actuating member pressing on and deforming the related domed area, the domed area snapping down to contact the related contact area on the circuit member.

7. A dial assembly as claimed in claim 6 said pushbutton molded integrally with said pushbutton member, each said pushbutton separated from the pushbutton member on three sides and cantilevered at a fourth side.

8. A dial assembly as claimed in claim 6, said pushbuttons arranged in columns and rows.

9. A dial assembly as claimed in claim 6, further including a face plate positioned on a front face of the push button member, the face plate including a plurality of apertures, an aperture for each pushbutton, a pushbutton extending through each aperture.

10. A dial assembly as claimed in claim 9, including electronic components mounted on said main portion and the flexible circuit member, a ground plane on said main portion, a flexible electrically conductive member connected at one end to said ground plane, said flexible electrically conductive member extending at its other end between said pushbutton member and said face plate, and electrically grounding means at an interface between said pushbutton member and said face plate in contact with said flexible electrically conductive member, whereby on connection of said ground plane to an electrical ground, static charges discharging at said pushbuttons by-pass said electronic components.

11. An assembly as claimed in claim 6, including a transmitter mounted on one end of said chassis member and a microphone mounted on the other end of said chassis member.

12. A telephone handset comprising front and back housings and a dial assembly as claimed in claim 10 mounted within said housings.

13. A dial assembly as claimed in claim 1, wherein each of said domed portions of said flexible transfer member comprises a plastic material.

14. A dial assembly as claimed in claim 1 or 13, wherein said plastic material comprises mylar.

15. A dial assembly as claimed in claim 1, wherein each of said domed portions comprises a hollow shape having a generally flat top surface, one side wall substantially vertical to said top surface and one side wall extending obliquely to said top surface.

* * * * *